United States Patent
Hee-Hanson et al.

(10) Patent No.: US 12,434,008 B1
(45) Date of Patent: Oct. 7, 2025

(54) LOCK RING FOR A MEDICAMENT DELIVERY DEVICE

(71) Applicant: Genzyme Corporation, Cambridge, MA (US)

(72) Inventors: Alexander Hee-Hanson, Melbourn (GB); Thomas Lever, Melbourn (GB); Michael Parrott, Melbourn (GB); Robert Wilson, Melbourn (GB); Haiming Wu, Cambridge, MA (US)

(73) Assignee: Genzyme Corporation, Cambridge, MA (US)

( * ) Notice: Subject to any disclaimer, the term of this patent is extended or adjusted under 35 U.S.C. 154(b) by 0 days.

(21) Appl. No.: 19/063,816

(22) Filed: Feb. 26, 2025

(51) Int. Cl.
*A61M 5/315* (2006.01)

(52) U.S. Cl.
CPC .... *A61M 5/31571* (2013.01); *A61M 5/31565* (2013.01); *A61M 5/31566* (2013.01)

(58) Field of Classification Search
CPC .......... A61M 5/31571; A61M 5/31566; A61M 5/31565
See application file for complete search history.

(56) References Cited

U.S. PATENT DOCUMENTS

| | | |
|---|---|---|
| 2,522,961 A | 9/1950 | William |
| 2,633,267 A | 3/1953 | Lebus |
| 3,886,513 A | 5/1975 | Smith et al. |
| 4,801,295 A | 1/1989 | Spencer |
| 5,045,062 A | 9/1991 | Henson |
| 5,176,275 A | 1/1993 | Bowie |
| 5,328,484 A | 7/1994 | Somers et al. |
| 5,396,051 A | 3/1995 | Kuhn et al. |
| 5,478,316 A | 12/1995 | Bitdinger et al. |
| 5,505,324 A | 4/1996 | Danico |
| 5,505,706 A | 4/1996 | Maus et al. |
| 5,536,917 A | 7/1996 | Suppelsa et al. |
| 5,622,274 A | 4/1997 | Bright |

(Continued)

FOREIGN PATENT DOCUMENTS

| | | |
|---|---|---|
| DE | 3921747 A1 | 1/1991 |
| EP | 3501577 A1 | 6/2019 |

(Continued)

OTHER PUBLICATIONS

Hamers-Casterman et al., "Naturally occurring antibodies devoid of light chains," Nature, Jun. 3, 1993, 363(6428):446-448.

(Continued)

*Primary Examiner* — Tasnim Mehjabin Ahmed
(74) *Attorney, Agent, or Firm* — Fish & Richardson P.C.

(57) ABSTRACT

The application relates to a lock ring for a medicament delivery device. The lock ring comprises a hollow main body formed from a plurality of circumferentially extending portions. Each portion is defined between tool split lines defining circumferential ends of the portions. Each circumferential end of a portion is connected to an adjacent portion along a tool split line. The main body comprises a plurality of bearing elements configured to contact a body of a medicament delivery device. Each of the plurality of bearing elements is configured to form a low friction rotation interface. At least one of the plurality of bearing elements is formed proximate to one of the circumferential ends of a portion of the main body.

21 Claims, 6 Drawing Sheets

(56) References Cited

U.S. PATENT DOCUMENTS

| | | | |
|---|---|---|---|
| 5,738,658 A | 4/1998 | Maus et al. | |
| 5,984,899 A | 11/1999 | D'Alessio et al. | |
| 6,080,461 A | 6/2000 | Wozniak et al. | |
| 6,394,985 B1 | 5/2002 | Lin | |
| 7,762,981 B2 | 7/2010 | Dacquay et al. | |
| 7,887,506 B1 | 2/2011 | Smolyarov et al. | |
| 7,918,824 B2 | 4/2011 | Bishop et al. | |
| 8,133,198 B2 | 3/2012 | Neer | |
| 8,409,138 B2 * | 4/2013 | James | A61M 5/2033 604/110 |
| 8,734,394 B2 | 5/2014 | Adams et al. | |
| 9,044,553 B2 | 6/2015 | James et al. | |
| 9,402,957 B2 | 8/2016 | Adams et al. | |
| 9,474,780 B2 | 10/2016 | Bokvist et al. | |
| 9,872,961 B2 | 1/2018 | Fourt et al. | |
| 10,118,001 B2 | 11/2018 | Fourt et al. | |
| 10,314,981 B2 | 6/2019 | Sampson et al. | |
| 10,350,362 B2 | 7/2019 | Dennis, Jr. et al. | |
| 10,363,377 B2 | 7/2019 | Atterbury et al. | |
| 11,298,462 B2 | 4/2022 | Atterbury et al. | |
| 11,331,432 B2 | 5/2022 | Holmqvist et al. | |
| 11,357,820 B2 | 6/2022 | Corvari et al. | |
| 11,369,751 B2 | 6/2022 | Ruan et al. | |
| 11,452,821 B2 | 9/2022 | LaFever et al. | |
| 2002/0055712 A1 | 5/2002 | Neracher | |
| 2004/0039336 A1 | 2/2004 | Amark et al. | |
| 2005/0101919 A1 | 5/2005 | Brunnberg | |
| 2005/0273061 A1 | 12/2005 | Hommann et al. | |
| 2006/0224124 A1 | 10/2006 | Scherer | |
| 2007/0270777 A1 | 11/2007 | Dacquay et al. | |
| 2008/0097311 A1 | 4/2008 | Dacquay et al. | |
| 2008/0097390 A1 | 4/2008 | Dacquay et al. | |
| 2008/0269692 A1 * | 10/2008 | James | A61M 5/3202 604/218 |
| 2009/0036868 A1 | 2/2009 | Pinedjian et al. | |
| 2009/0281496 A1 | 11/2009 | Matusch | |
| 2010/0211005 A1 | 8/2010 | Edwards et al. | |
| 2011/0054414 A1 | 3/2011 | Shang et al. | |
| 2011/0144594 A1 | 6/2011 | Sund et al. | |
| 2011/0202011 A1 | 8/2011 | Wozencroft | |
| 2011/0319813 A1 | 12/2011 | Kamen et al. | |
| 2013/0237921 A1 | 9/2013 | Lannan et al. | |
| 2013/0267897 A1 | 10/2013 | Kemp et al. | |
| 2014/0236076 A1 | 8/2014 | Marshall et al. | |
| 2014/0249483 A1 | 9/2014 | Kiilerich et al. | |
| 2014/0263156 A1 | 9/2014 | Newsom et al. | |
| 2014/0276637 A1 | 9/2014 | Massey, Jr. | |
| 2015/0246180 A1 | 9/2015 | Fenlon et al. | |
| 2015/0273162 A1 | 10/2015 | Holmqvist | |
| 2016/0001015 A1 | 1/2016 | Kucuk et al. | |
| 2016/0354555 A1 | 12/2016 | Gibson et al. | |
| 2016/0367763 A1 | 12/2016 | Tschirren et al. | |
| 2017/0215699 A1 | 8/2017 | Ouyang et al. | |
| 2017/0216526 A1 | 8/2017 | Brereton et al. | |
| 2017/0224929 A1 | 8/2017 | Sampson et al. | |
| 2017/0246403 A1 | 8/2017 | Cowe et al. | |
| 2017/0361034 A1 | 12/2017 | Scheller et al. | |
| 2018/0250471 A1 | 9/2018 | Grimoldby et al. | |
| 2018/0339114 A1 | 11/2018 | Wendland et al. | |
| 2019/0030249 A1 | 1/2019 | Gonzalez et al. | |
| 2019/0192785 A1 | 6/2019 | Wendland et al. | |
| 2019/0366000 A1 | 12/2019 | Cowe et al. | |
| 2020/0114041 A1 | 4/2020 | Alas et al. | |
| 2020/0316314 A1 | 10/2020 | Buri et al. | |
| 2021/0077732 A1 | 3/2021 | Egelhofer | |
| 2021/0196900 A1 | 7/2021 | Apply et al. | |
| 2022/0015429 A1 | 1/2022 | Brown et al. | |
| 2022/0176042 A1 | 6/2022 | Belisle | |
| 2022/0395640 A1 | 12/2022 | Schwartzentruber | |
| 2023/0001099 A1 | 1/2023 | Dunn | |
| 2023/0238105 A1 | 7/2023 | Schneider et al. | |
| 2023/0347074 A1 | 11/2023 | Gavin | |
| 2024/0009397 A1 | 1/2024 | In et al. | |

FOREIGN PATENT DOCUMENTS

| | | |
|---|---|---|
| WO | WO 2002/047746 A1 | 6/2002 |
| WO | WO 2004/058820 A2 | 7/2004 |
| WO | WO 2004/068820 A2 | 8/2004 |
| WO | WO 2005/018629 A1 | 3/2005 |
| WO | WO 2006/003388 A2 | 1/2006 |
| WO | WO 2006/030220 A1 | 3/2006 |
| WO | WO 2011/109205 A2 | 9/2011 |
| WO | WO 2016/081238 A1 | 5/2016 |
| WO | WO 2019/074788 A1 | 4/2019 |
| WO | WO 2020/190529 A1 | 9/2020 |

OTHER PUBLICATIONS

Holt et al., "Domain antibodies: proteins for therapy," Trends in Biotechnology, Nov. 2003, 21(11):484-490.

Muyldermans, "Single domain camel antibodies: current status," Reviews in Molecular Biotechnology, Jun. 2001, 74(4):277-302.

Needle-based injection systems for medical use requirements and test methods, Part 1: Needle injection systems, ISO 11608-1:2014(E), Third Edition, Switzerland, ISO, Dec. 15, 2014, pp. 1-13.

Ward et al., "Binding activities of a repertoire of single immunoglobulin variable domains secreted from *Escherichia coli*," Nature, Oct. 1, 1989, 341(6242):544-546.

\* cited by examiner

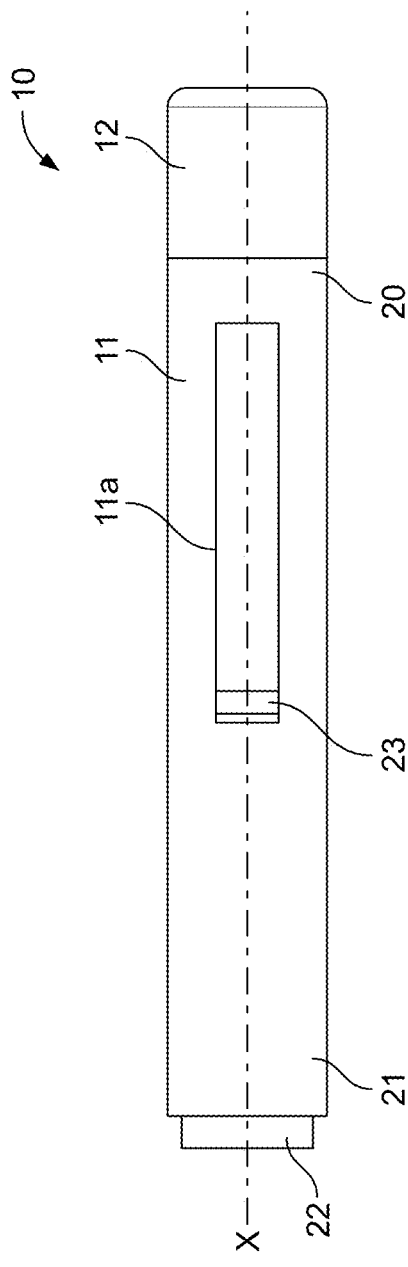
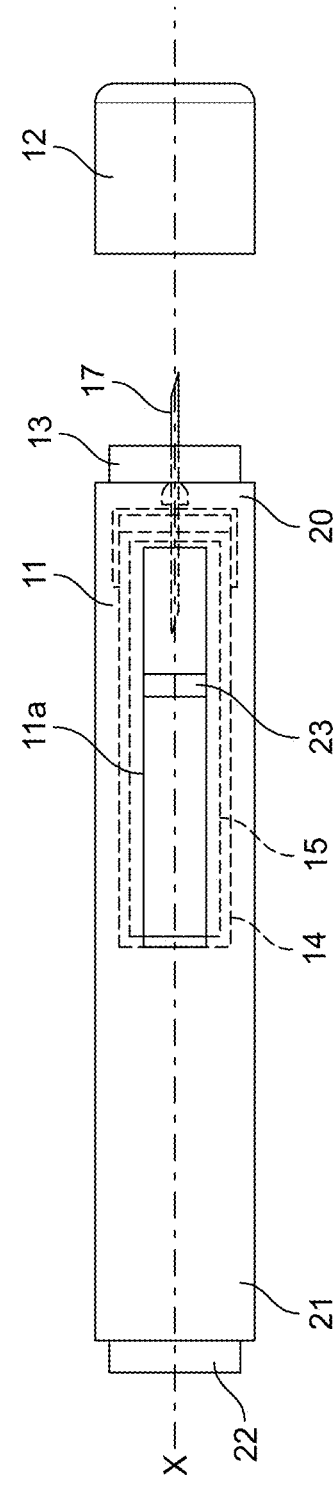
FIG. 1A
FIG. 1B

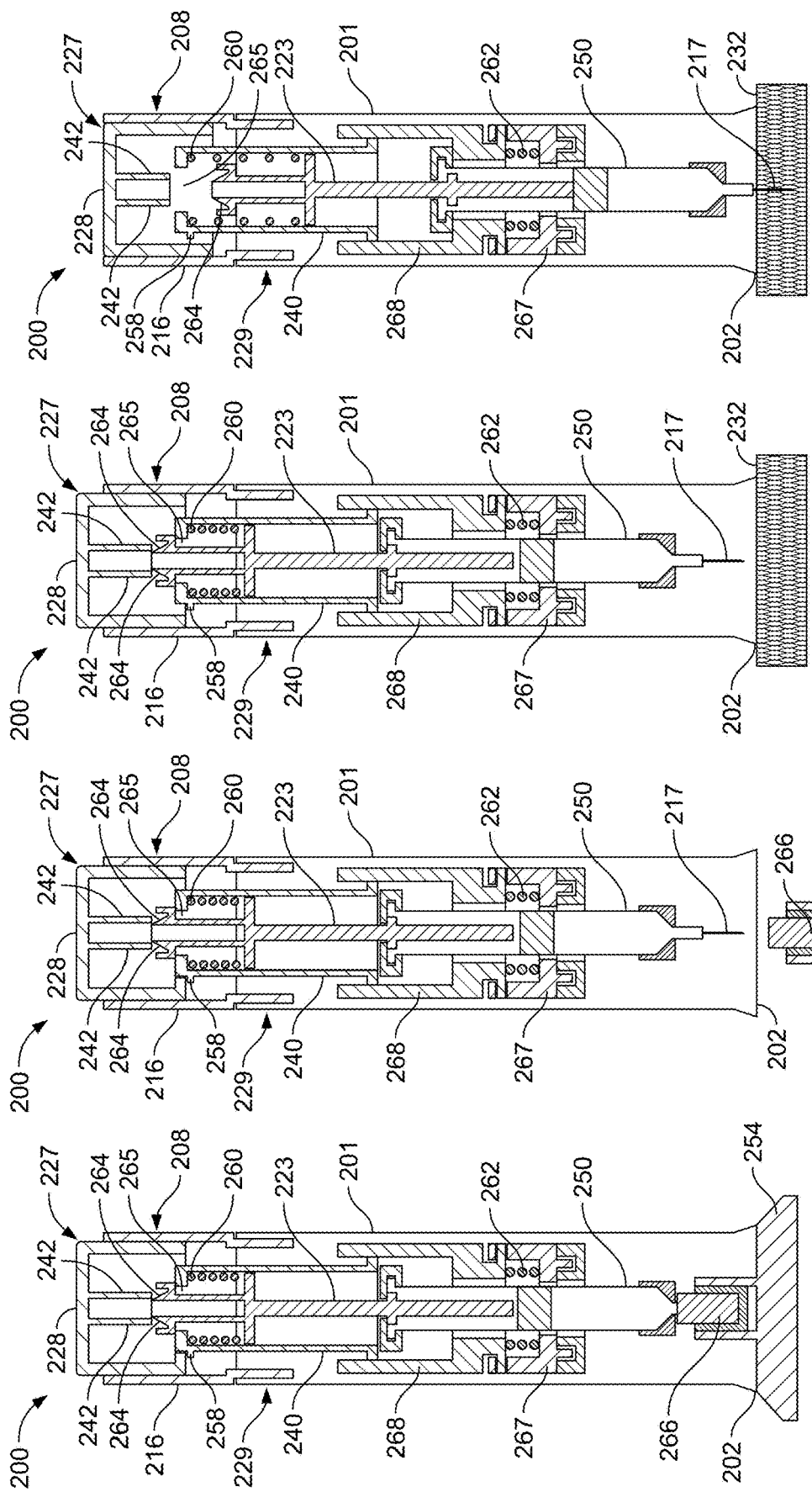

LOCK RING FOR A MEDICAMENT DELIVERY DEVICE

TECHNICAL FIELD

The present application relates to a lock ring for a medicament delivery device, a medicament delivery device comprising a lock ring, and a method of forming a lock ring.

BACKGROUND

A lock ring is a component of a medicament delivery device that is designed to be located proximate to a proximate end of a medicament delivery device. The lock ring is utilized mainly to move between a pre-use position, in which a button of the medicament delivery device is prevented from being depressed, and a use position, in which a button of the medicament delivery device is able to be depressed to trigger a dispensing mechanism.

Known lock rings often have geometries and features that can only be formed by a moulding step that requires a tooling apparatus that has a large number of moveable moulding parts. Complex tooling apparatus with a large number of moveable parts can be expensive and prone to malfunction.

SUMMARY

According to a first aspect, there is provided a lock ring for a medicament delivery device. The lock ring comprises a hollow main body formed from a plurality of circumferentially extending portions, each portion defined between tool split lines defining circumferential ends of the portions, each circumferential end of a portion is connected to an adjacent portion along a tool split line, the main body comprising a plurality of bearing elements configured to contact a body of a medicament delivery device, wherein each of the plurality of bearing elements is configured to form a low friction rotation interface, and wherein at least one of the plurality of bearing elements is formed proximate to one of the circumferential ends of a portion of the main body.

At least one of the bearing elements may be formed on or proximate to a tool split line. As a result, the number of tool parts required to form the lock ring can be reduced, which in turn reduces the complexity and cost of the tooling apparatus required to manufacture the lock ring. The lock ring may be formed as an integral part increasing its structural strength.

In some embodiments, the at least one of the plurality of bearing elements may be formed on at least one of the circumferential ends of one of the portions of the main body such that it forms a part of the circumferential ends.

In some embodiments, the at least one of the plurality of bearing elements may be formed by a first part and a second part, the first part may be formed on a first circumferential end of a first portion of the main body, and the second part may be formed on a second circumferential end of a second portion of the main body that is adjacent to the first portion of the main body.

A bearing element may be formed across a tool split line such that the two parts are merged. Thus, the strength of the bearing element may be increased. As a result, the bearing element is less prone to failure and able to align the lock ring correctly within a device even under high loads.

In some embodiments, the first and second parts of the at least one of the plurality of bearing elements may be formed with reflectional symmetry on adjacent portions of the main body about the tool split line.

Thus, forces may be distributed evenly throughout the bearing element, which may reduce the likelihood of component failure. In addition, the reflectional symmetry may reduce the complexity of the tooling apparatus required.

In some embodiments, each portion of the main body may comprise a first part of one of the plurality of bearing elements on its first circumferential end and a second part of one of the plurality of bearing elements on its second circumferential end.

Thus, at least two bearing elements may be at least partially formed on each portion of the main body. As a result, the number of bearing elements on the lock ring can be at least the same as known lock rings but can be formed using fewer portions and less complex tooling.

In some embodiments, the at least one of the plurality of bearing elements may be spaced circumferentially from one of the circumferential end of one of the portions of the main body by an aperture.

Thus, the bearing element of one portion is not connected to merged directly with another portion. As a result, the bearing element may have greater flexibility.

In some embodiments, a first bearing of the plurality of bearing elements may be formed proximate to a first circumferential end of a first portion of the main body and a second bearing element may be formed proximate to a first circumferential end of a second portion of the main body.

In some embodiments, the first and second bearing elements may be formed with rotational symmetry on adjacent portions of the main body about a central longitudinal axis of the main body.

The bearing elements may be formed diametrically opposite each other. This may distribute forces evenly. In addition, the tooling apparatus may be simplified and the mould parts may be identical reducing production costs.

In some embodiments, the at least one of the plurality of bearing elements may be formed by a circumferentially extending beam.

The circumferentially extending beam may retain the general shape of the main body of the lock ring and may provide a long moment arm for the bearing to be located on.

In some embodiments, the circumferentially extending beam may be defined by first and second slots extending either side of the beam.

In some embodiments, the first and second slots may extend generally circumferentially from at least one of the circumferential ends of at least one portion of the main body.

Thus, the circumferential beam may be constrained only on an end. Thus, the beam may freely flex about its anchor point to the rest of the portion.

In some embodiments, the first and second slots may extend perpendicularly to the longitudinal axis of the main body and parallel to each other.

In some embodiments, the circumferentially extending beam may comprise a radially outwardly extending protrusion.

The protrusion may contact the inner surface of the housing of a device. Thus, due to variations in tolerance between the lock ring and the housing, the contact points of the protrusions may cause the bearing element to flex inwards whilst maintain a low friction contact surface to keep the lock ring centred in the housing.

In some embodiments, a first part of the protrusion may be formed on the first portion of the main body and a second part of the protrusion may be formed on the second part of the main body, the two parts being merged at the tool split line.

In some embodiments, a first section of the circumferential beam may be formed in the first portion of the main body, and a second section of the circumferential beam may be formed in the second portion of the main body, the two sections of the beam being merged at the tool split line.

In some embodiments, a circumferential end of the protrusion may be located on a free-end of the circumferentially extending beam.

Thus, the protrusion may be located at the furthest distance from the constrained end of the circumferential beam. Thus, the deflection angle of the beam can be minimised which decreases likelihood of failure of the components during use.

In some embodiments, the main body is formed from two circumferentially extending portions.

Thus, the number of mould parts required may be reduced and the tooling apparatus may be simplified.

In some embodiments, each of the circumferentially extending portions may comprise a first section configured to form an outer surface of a medicament delivery device, and a second section comprising the plurality of bearing elements, the second section may be configured to be received within a housing of a medicament delivery device, wherein the first section may comprise a circumferential surface, the circumferential surface of a first section of at least one of the portions may comprise a planar section configured to indicate the position of the lock ring relative to a medicament delivery device, during use.

In some embodiments, the components of the lock ring may be an integrally formed monolithic structure.

Thus, each portion defined between the tool split lines may be integrally formed. As a result, each portion may be merged along the tool split lines to form a single piece. Thus, the portions may be secured to one another to increase the durability of the lock ring.

According to a second aspect, there is provided a medicament delivery device comprising a lock ring according to any one of claim 1 to claim 18.

According to a third aspect, there is provided a method of forming a lock ring according to any one of claims 1 to claim 19. The method comprises the steps of positioning a plurality of mould parts to form a lock ring shaped cavity, providing a material injection port in at least one of the mould parts, performing a single injection of material into the lock ring shaped cavity to fill the lock ring shaped cavity, and cooling the material to form the lock ring.

According to a fourth aspect, there is provided a lock ring for a medicament delivery device. The lock ring comprises a hollow main body comprising a plurality of bearing elements configured to contact a body of a medicament delivery device, wherein at least one of the plurality of bearing elements is formed from a circumferential beam defined between first and second slots extending through the main body, wherein first and second ends of the beam are connected to the main body, and wherein the circumferential beam comprises a radially outward extending protrusion thereon, the protrusion being configured to form a low friction rotation surface and contact an inner surface of a body of a medicament delivery device during use.

According to a fifth aspect, there is provided a lock ring for a medicament delivery device. The lock ring comprises a hollow main body comprising a plurality of bearing elements configured to contact a body of a medicament delivery device, wherein at least one of the plurality of bearing elements is formed from a circumferential beam defined between first and second slots extending through the main body, wherein the circumferential beam comprises a free end that is spaced from the main body by an aperture, wherein the circumferential beam comprises a radially outward extending protrusion thereon, the protrusion being configured to form a low friction rotation surface and contact an inner surface of a body of a medicament delivery device during use.

BRIEF DESCRIPTION OF THE DRAWINGS

Embodiments will now be described, by way of example only, with reference to the accompanying drawings, in which:

FIG. 1A shows a schematic view of a medicament delivery device with a cap attached;

FIG. 1B shows a schematic view of the medicament delivery device of FIG. 1A with the cap removed;

FIG. 2A shows a schematic view of a medicament delivery device prior to use (i.e. in a pre-use configuration);

FIG. 2B shows a schematic view of the device of FIG. 2A with the cap removed;

FIG. 2C shows a schematic view of the device of FIG. 2A showing the device placed at an injection site;

FIG. 2D shows a schematic view of the device of FIG. 2A with the button having been pressed to release the dispensing mechanism;

DETAILED DESCRIPTION

Figure 2G:
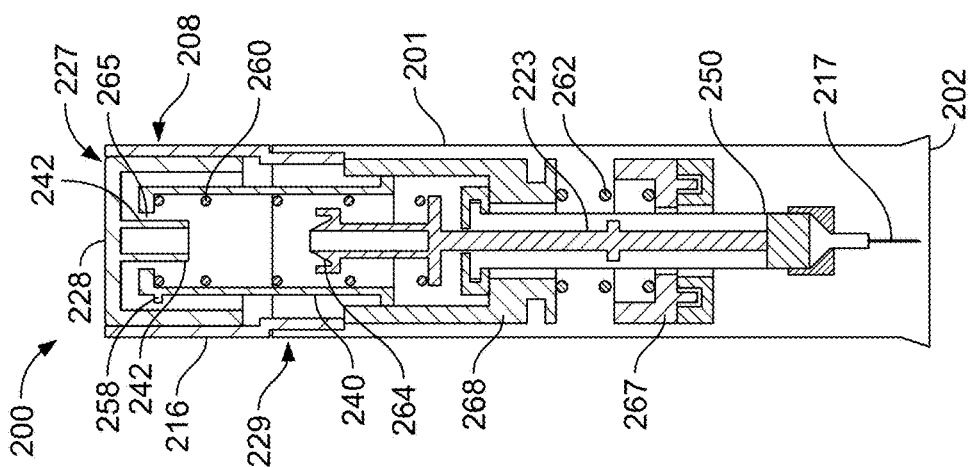
FIG. 2G shows a schematic view of the device of FIG. 2A showing the device removed from the injection site after the needle has retracted within the device after delivery of the medicament.

A drug delivery device, as described herein, may be configured to inject a medicament into a patient. For example, delivery could be sub-cutaneous, intra-muscular, or intravenous. Such a device could be operated by a patient or care-giver, such as a nurse or physician, and can include various types of safety syringe, pen-injector, or auto-injector. The device can include a cartridge-based system that requires piercing a sealed ampule before use. Volumes of medicament delivered with these various devices can range from about 0.5 ml to about 2 ml. Yet another device can include a large volume device ("LVD") or patch pump, configured to adhere to a patient's skin for a period of time (e.g., about 5, 15, 30, 60, or 120 minutes) to deliver a "large" volume of medicament (typically about 2 ml to about 10 ml).

In combination with a specific medicament, the presently described devices may also be customized in order to operate within required specifications. For example, the device may be customized to inject a medicament within a certain time period (e.g., about 3 to about 20 seconds for auto-injectors, and about 10 minutes to about 60 minutes for an LVD). Other specifications can include a low or minimal level of discomfort, or to certain conditions related to human factors, shelf-life, expiry, biocompatibility, environmental considerations, etc. Such variations can arise due to various factors, such as, for example, a drug ranging in viscosity from about 3 cP to about 50 cP. Consequently, a drug delivery device will often include a hollow needle ranging from about 25 to about 31 Gauge in size. Common sizes are 27 and 29 Gauge.

The delivery devices described herein can also include one or more automated functions. For example, one or more of needle insertion, medicament injection, and needle retraction can be automated. Energy for one or more automation steps can be provided by one or more energy sources. Energy sources can include, for example, mechanical, pneumatic, chemical, or electrical energy. For example, mechanical energy sources can include springs, levers, elastomers, or other mechanical mechanisms to store or release energy. One or more energy sources can be combined into a single device. Devices can further include gears, valves, or other mechanisms to convert energy into movement of one or more components of a device.

The one or more automated functions of an auto-injector may each be activated via an activation mechanism. Such an activation mechanism can include one or more of a button, a lever, a needle sleeve, or other activation component. Activation of an automated function may be a one-step or multi-step process. That is, a user may need to activate one or more activation components in order to cause the automated function. For example, in a one-step process, a user may depress a needle sleeve against their body in order to cause injection of a medicament. Other devices may require a multi-step activation of an automated function. For example, a user may be required to depress a button and retract a needle shield in order to cause injection.

In addition, activation of one automated function may activate one or more subsequent automated functions, thereby forming an activation sequence. For example, activation of a first automated function may activate at least two of needle insertion, medicament injection, and needle retraction. Some devices may also require a specific sequence of steps to cause the one or more automated functions to occur. Other devices may operate with a sequence of independent steps.

Some delivery devices can include one or more functions of a safety syringe, pen-injector, or auto-injector. For example, a delivery device could include a mechanical energy source configured to automatically inject a medicament (as typically found in an auto-injector) and a dose setting mechanism (as typically found in a pen-injector).

According to some embodiments of the present disclosure, an exemplary drug delivery device 10 is shown in FIGS. 1A & 1B. The device 10, as described above, is configured to inject a medicament into a patient's body. The device 10 includes a housing 11 which typically contains a reservoir containing the medicament to be injected (e.g., a syringe) and the components required to facilitate one or more steps of the delivery process. The device 10 can also include a cap assembly 12 that can be detachably mounted to the housing 11. A user typically removes the cap assembly 12 from the housing 11 before the device 10 can be operated.

As shown, the housing 11 is substantially cylindrical and has a substantially constant diameter along the longitudinal axis X. The housing 11 has a distal region 20 and a proximal region 21. The term "distal" refers to a location that is relatively closer to a site of injection, and the term "proximal" refers to a location that is relatively further away from the injection site.

The device 10 can also include a needle sleeve 13 coupled to the housing 11 to permit movement of the sleeve 13 relative to the housing 11. For example, the sleeve 13 can move in a longitudinal direction parallel to longitudinal axis X. Specifically, movement of the sleeve 13 in a proximal direction can permit a needle 17 to extend from distal region 20 of the housing 11.

Insertion of the needle 17 can occur via several mechanisms. For example, the needle 17 may be fixedly located relative to the housing 11 and initially be located within an extended needle the sleeve 13. Proximal movement of the sleeve 13 by placing a distal end of the sleeve 13 against a patient's body and moving the housing 11 in a distal direction will uncover the distal end of the needle 17. Such relative movement allows the distal end of the needle 17 to extend into the patient's body. Such insertion is termed "manual" insertion as the needle 17 is manually inserted via the patient's manual movement of the housing 11 relative to the sleeve 13.

Another form of insertion is "automated," whereby the needle 17 moves relative to the housing 11. Such insertion can be triggered by movement of the sleeve 13 or by another form of activation, such as, for example, a button 22. As shown in FIGS. 1A & 1B, the button 22 is located at a proximal end of the housing 11. However, in other embodiments, the button 22 could be located on a side of the housing 11.

Other manual or automated features can include drug injection or needle retraction, or both. Injection is the process by which a bung or piston 23 is moved from a proximal location within a syringe (not shown) to a more distal location within the syringe in order to force a medicament from the syringe through the needle 17. In some embodiments, a drive spring (not shown) is under compression before the device 10 is activated. A proximal end of the drive spring can be fixed within the proximal region 21 of the housing 11, and a distal end of the drive spring can be configured to apply a compressive force to a proximal surface of the piston 23. Following activation, at least part of the energy stored in the drive spring can be applied to the proximal surface of the piston 23. This compressive force can act on the piston 23 to move it in a distal direction. Such distal movement acts to compress the liquid medicament within the syringe, forcing it out of the needle 17.

Following injection, the needle 17 can be retracted within the sleeve 13 or the housing 11. Retraction can occur when the sleeve 13 moves distally as a user removes the device 10 from a patient's body. This can occur as the needle 17 remains fixedly located relative to the housing 11. Once a distal end of the sleeve 13 has moved past a distal end of needle 17, and the needle 17 is covered, the sleeve 13 can be locked. Such locking can include locking any proximal movement of the sleeve 13 relative to the housing 11.

Another form of needle retraction can occur if the needle 17 is moved relative to the housing 11. Such movement can occur if the syringe within the housing 11 is moved in a proximal direction relative to the housing 11. This proximal movement can be achieved by using a retraction spring (not shown), located in the distal region 20. A compressed retraction spring, when activated, can supply sufficient force to the syringe to move it in a proximal direction. Following sufficient retraction, any relative movement between the needle 17 and the housing 11 can be locked with a locking mechanism. In addition, the button 22 or other components of the device 10 can be locked as required.

FIGS. 2A to 2G show the sequential steps of operating a medicament delivery device 200. The medicament delivery device is an autoinjector.

The medicament delivery device 200 comprises a body 201, a syringe 250 having a needle 217, and an axially moveable plunger 233 for dispensing medicament from the syringe 250. The medicament delivery device 200 comprises a cap 254 which is removably attached to the body 201 and covers a distal end 202 of the body 201 for preventing access to the needle 217. The medicament delivery device 200 has a needle shield 266 that covers the needle 217 before use. The needle shield 266 is attached to the cap 254.

The medicament delivery device 200 has a dispensing mechanism 229. The medicament delivery device 200 has an actuation member 227 which is configured to release the dispensing mechanism 229. The actuation member 227 is configured to engage the dispensing mechanism 229 to release the dispensing mechanism 229.

The dispensing mechanism 229 is configured to cause the needle 217 to move distally from a needle pre-use position, in which the needle 217 is recessed within the body 201, to an injection position, in which the needle 217 protrudes from the distal end 202 of the body 201 when the dispensing mechanism 229 is released.

The dispensing mechanism 229 is configured to dispense the medicament from the needle 217 when the needle 217 is in the injection position.

As shown in FIGS. 2B and 2C, in order to deliver a dose of medicament to an injection site, the cap 254 is removed (as shown in FIG. 2B) and the medicament delivery device 200 is placed at an injection site 232 (as shown in FIG. 2C).

The actuation member 227 comprises a button 228 and is prevented from being depressed by a stop 258. The stop 258 is provided on the spring guide 240, for example.

The medicament delivery device 200 has a locking member 208 in the form of a lock ring 216 which is rotatable by a user about a longitudinal axis of the medicament delivery device 200. The actuation member 227 is keyed to the lock ring 216 so that the actuation member 227 rotates with the lock ring 216. The lock ring 216 is rotatable from a pre-use position, in which distal movement of the button 228 is prevented, to a use position, in which distal movement of the button 228 is permitted.

When the lock ring 216 is in the pre-use position then the stop 258 engages the button 228 to prevent the button 228 from being depressed.

In order to allow the button 228 to be depressed, the lock ring 216 is rotated about the longitudinal axis of the medicament delivery device 200 from the pre-use position to the use position. The rotation of the lock ring 216 also rotates the actuation member 227 to a position in which the stop 258 no longer prevents the button 228 from being depressed as shown, for example, in FIG. 2C.

Turning now to FIG. 2D, the user then presses the button 228 to release the dispensing mechanism 229 for dispensing medicament from the medicament delivery device 200. The dispensing mechanism 229 has a plunger 233 and a bias in the form of a compression spring 260. The plunger 223 is biased distally by the spring 260.

The dispensing mechanism 229 is at least partially housed within the spring guide 240. The plunger 223 has a release member, which has proximally-extending clips 264. The spring 260 is retained in the compressed position by virtue of the clips 264, which protrude through a proximal opening 265 in the spring guide 240. The clips 264 engage the spring guide 240 for maintaining the plunger 223 in a proximal position.

The actuation member 227 has a firing member comprising a pair of protrusions 242 which engage with the clips 264 when the button 228 is depressed to flex the clips 264 radially inwardly thereby allowing the clips 264 to move distally through the proximal opening 265 to release the spring 260.

When the dispensing mechanism 229 is released, then the syringe 250 is released for distal axial movement towards the injection site 232 such that the needle 217 moves from the needle pre-ise retracted position to an exposed (or "uncovered" or "injection") position for delivering medicament to the injection site 232 under the biasing force of the compression spring 260.

Figure 2F:
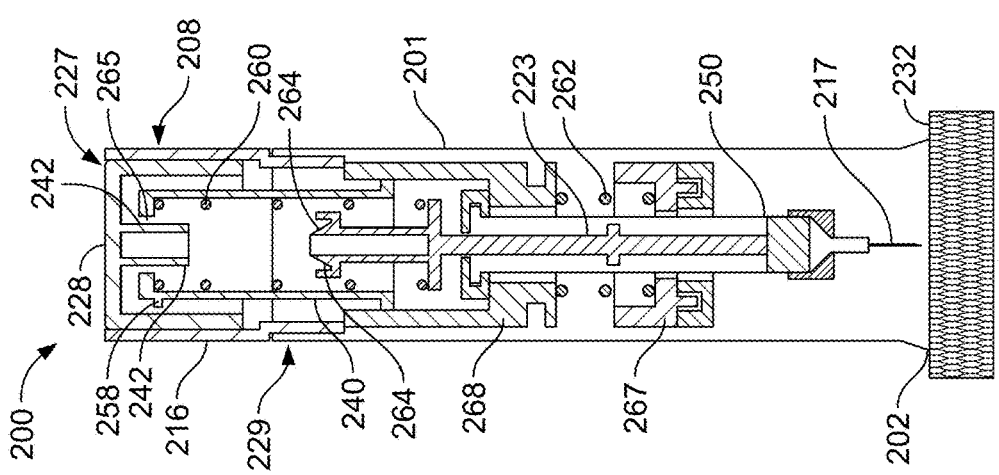
FIG. 2F shows a schematic view of the device of FIG. 2A showing the needle having retracted within the device after a dose has been delivered.
Figure 2E:
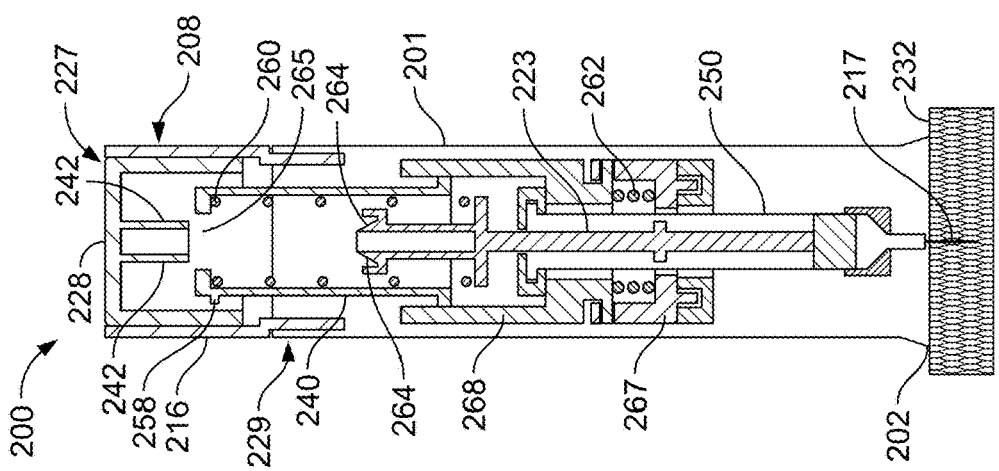
FIG. 2E shows a schematic view of the device of FIG. 2A with the button having been pressed to release the dispensing mechanism.

Depressing the button 228 releases the plunger 223, which, biased by the bias 260, moves along the syringe 250 towards the distal end of the medicament delivery device 200 to force medicament within the syringe 250 through the needle 217, thereby delivering a dose of medicament as shown, for example in FIG. 2E.

As shown in FIG. 2F, once the dose of medicament has been delivered, a medicament container bias 262, embodied by a further spring 262, then causes the needle 217 to move axially back to the retracted position, away from the injection site 232 in a proximal direction. The plunger 223 flexes a clip (not shown) on a first collar 267, which allows the first collar 267 to rotate relative to the body 201 and relative to a second collar 268. The first collar 267 rotates from a first position, in which the second collar 268 is axially coupled to the first collar 267, into a second position, in which the second collar 268 is free to move axially relative to the first collar 267. For example, the second collar 268 may comprise a radially protruding coupling element configured to be received in or engage with a corresponding receiving portion of the first collar 267, such that rotating the first collar 267 from the first position into the second position causes the coupling element to be moved out from the receiving portion, to allow the second collar 268 to move axially relative to the first collar 267. Axial movement of the second collar 268 permits the needle 217 to be retracted.

As shown in FIG. 2G, the medicament delivery device 200 is then removed from the injection site 232, for disposal.

Figure 3:
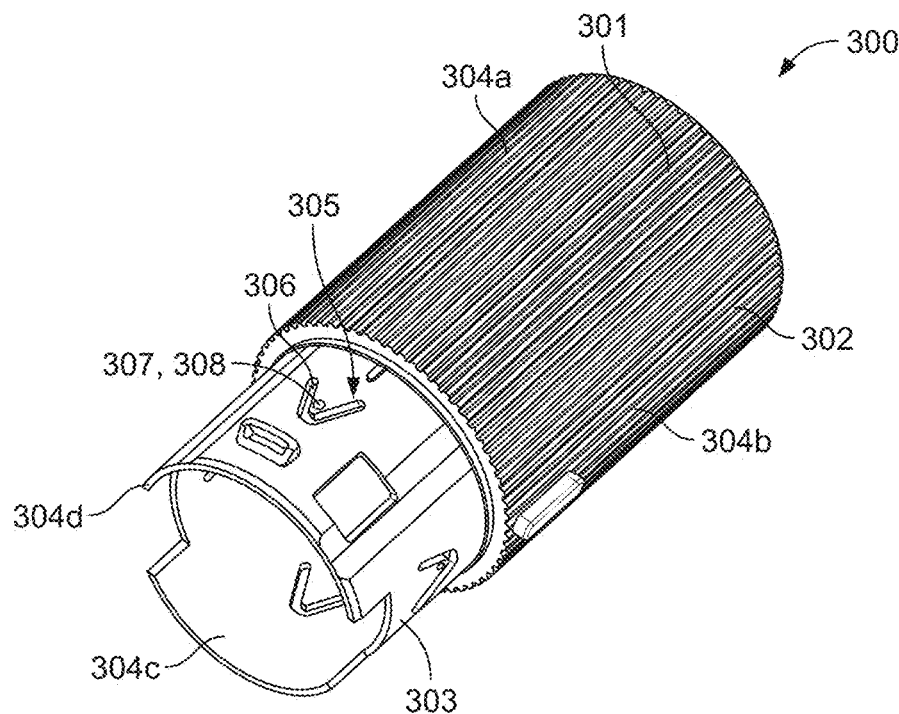
FIG. 3 shows a schematic perspective view of a known lock ring.

FIG. 3 is a schematic perspective view of a known lock ring 300. The lock ring 300 comprises a main body 301 that is hollow and generally cylindrical. The main body 301 of the lock ring 300 is formed of a first section 302 and a second section 303. The first section 302 forms a part of an outer surface of a medicament delivery device 200. The first section 302 is configured to be gripped by a user to rotate the lock ring 300 between the pre-use position and the use position, as previously described. The second section 303 is configured to be received within the body 201 of a medicament delivery device 200.

The lock ring 300 is formed by an injection moulding process. The injection moulding process uses five mould parts: a central mould part that defines the hollow of the lock ring and forms an internal surface of an annular cavity, and four external parts that are brought together to define an outer surface of an annular cavity. The central mould part may be formed by two parts. Material is injected into the cavity to form the lock ring 300. At the locations where the four external parts contact each other, tool split lines are formed in the lock ring 300. Tool split lines, also known as parting lines, are formed at the locations where adjacent mould parts meet during the moulding process and where you can separate two mould parts to release the component without causing damage. Adjacent tool split lines define portions 304a-d of the integral, monolithic lock ring therebetween.

The lock ring 300 may be rotationally locked to an actuation member 227, as shown in FIGS. 2A to 2G. The actuation member 227 may comprise a button 228. A stop 258 is configured to prevent the button 228, shown in FIGS. 2A to 2G located at the proximal end of the lock ring 300 from being depressed in the distal direction when the lock ring 300 is in a pre-use position. The lock ring 300 may be rotated from the pre-use position to a use position to move an arm of the button 228 such that is no longer aligned with the stop 258. Thus, when the lock ring 300 is in the use position, the button 228 may be depressed to trigger a dispensing mechanism 229.

Each portion 304a-d of the lock ring 300 comprises a bearing element 305. Thus, the lock ring 300 comprises four bearing elements 305. The four bearing elements 305 are spaced equidistantly about the circumference of the lock ring 300. Each portion 304a-d has a centrally located bearing element 305 in the circumferential direction. Each bearing element 305 is defined by a V-shaped slot 306 through the thickness of the portion 304a-d. Thus, each bearing element 305 is generally triangular shaped.

An apex 307 of the bearing element 305 comprises a protrusion 308. The protrusion 308 is a hemi-spherical projection. The protrusion 308 extends radially outwards from each portion 304a-d. The protrusion 308 is configured to abut an inner surface of a housing 201 of a medicament delivery device 200, shown in FIGS. 2A to 2G. The slot 306 allows for the bearing element 305 to deform radially inwardly when there is contact between the housing 201 and the protrusion 308. The protrusion 308 provides a contact surface with the housing 201 that allows rotation and reduces wobble of the lock ring 300 relative to the housing 201.

Figure 4:
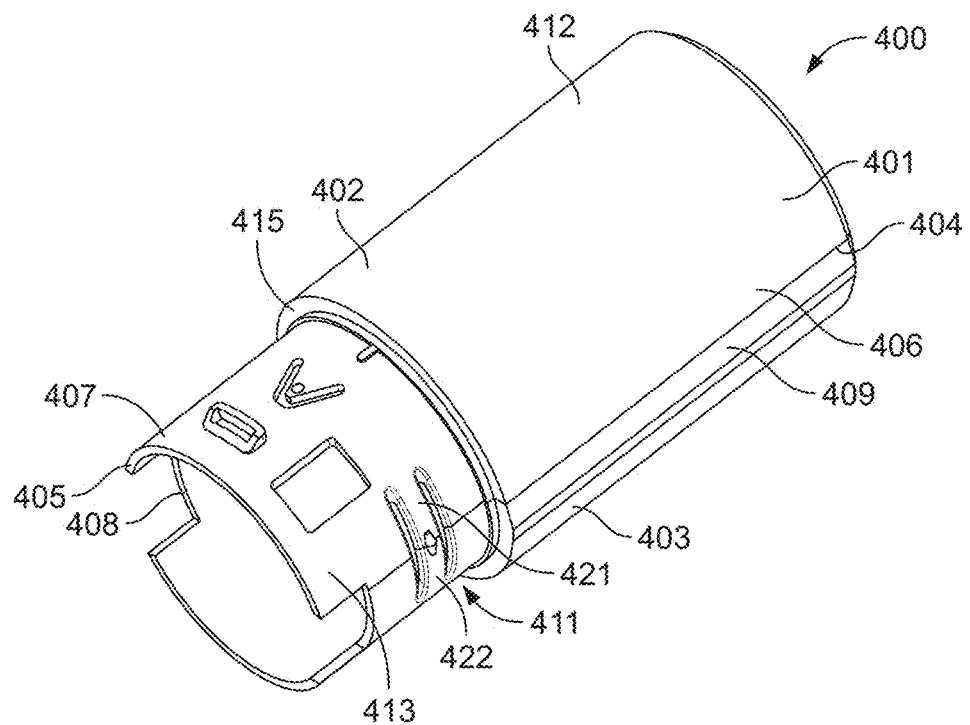
FIG. 4 shows a schematic perspective view of an embodiment of a lock ring.

Referring now to FIG. 4, there is shown a schematic perspective view of an exemplary embodiment of a lock ring 400 for a medicament delivery device 200. The lock ring 400 comprises a hollow main body 401. The hollow main body 401 is formed from a plurality of circumferentially extending portions 402, 403. Each portion 402, 403 is defined between tool split lines 404, 405. The tool split lines 404, 405 define circumferential ends 406-409 of the portions 402, 403. Each circumferential ends 406-409 of a portion 402, 403 is connected to an adjacent portion 402, 403 along a tool split 404, 405.

The main body 401 comprises a plurality of bearing elements 411. The plurality of bearing elements 411 are configured to contact a body 201 of a medicament delivery device 200. That is, the plurality of bearing elements 411 are configured to contact and inner surface of a body 201 of a medicament delivery device 200. Each of the plurality of bearing elements 411 is configured to form a low friction rotation interface. At least one of the plurality of bearing elements 411 is formed proximate to one of the circumferential ends 406-409 of a portion 402, 403 of the main body 401.

The main body 401 may be generally cylindrical. Each portion 402, 403 of the main body 401 may comprise a first section 413 and the second section 414. The first section 413 and the second section 414 may have different diameters. That is, the diameter of the first section 413 may be larger than the diameter of the second section 414. The first section 413 may form a part of an outer surface of a medicament delivery device 200. The first section 413 may be configured to be gripped by a user to rotate the lock ring 400 between the pre use position and the use position, as previously described. Thus, an outer surface of the first section 413 may be aligned with the outer surface of a body 201 of the medicament delivery device 200 when the lock ring 400 is assembled with the rest of the device 200. The second section 414 may be configured to be received within the body 201 of a medicament delivery device 200.

As shown in FIG. 4, the plurality of bearing elements 411 may be formed in the second section 413 of each portion 402, 403 of the main body 401 of the lock ring 400. Thus, each of the plurality of bearing elements 411 make contact an inner surface (not shown) of the body 201 of a medicament delivery device 200.

The first and second sections 413, 414 of each portion 402, 403 of the lock ring 400 may be joined by a shoulder 415. The shoulder 415 may extend in a plane that extends perpendicularly to the longitudinal axis of the main body 401 of the lock ring 400. The shoulder 415 may abut a proximal end of the body 201 of the medicament delivery device 200. In some embodiments, the shoulder 415 may comprise a distally extending projection (not shown). The distally extending projection may be configured to provide a low friction contact surface between the lock ring 400 and the proximal end of the body 201 of the medicament delivery device 200.

In the present embodiment, the main body 401 of the lock ring 400 may be formed by two portions: a first portion 402 and a second portion 403. Each of the first and second portions 402, 403 may form a hemi-circular arc between the tool split lines 404, 405 and may be integrally formed. The lock ring 400 may be formed by an injection moulding process. The injection moulding process may use 3 mould parts: a central mould part that defines the hollow of the lock ring 400 and forms an internal surface of an annular cavity, and two external mould parts that are brought together to define an outer surface of an annular cavity. The two external mould parts may each form a hemi-circular arc.

Thus, the hollow main body 401 of the lock ring 400 may comprise two tool split lines 404, 405. The two tool split lines 404, 405 may be formed at the point where the two external mould parts meet during the injection forming process. The tool splits lines 404, 405 may extend in a direction parallel to the longitudinal axis of the lock ring 400. The tool split lines 404, 405 delimit the first portion 402 and the second portion 403 in the circumferential direction.

The first tool split line 404 may define a first circumferential end 406 of the first portion 402 of the main body 401 and a second circumferential end 409 of the second portion 403 of the main body 401. The first circumferential end 406 of the first portion 402 may be joined to the second circumferential end 409 of the second portion 403 at the first tool split line 404. That is, the first and second portions 402, 403 may merge at the first tool split line 404. The second tool split line 405 may define a second circumferential end 407 of the first portion 402 of the main body 401 and the first circumferential end 408 of the second portion 403 of the main body 401. The second circumferential end 407 of the first portion 402 may be joined to the first circumferential end 408 of the second portion 403 at the second tool split line 405. That is, the first and second portions 402, 403 may merge at the second tool split line 405.

In some embodiments, it will be appreciated that the first and second portions 402, 403 of the main body 401 of the lock ring 400 may be integrally formed. That is the first and second portions 402, 403 of the main body 401 may be formed as an integrated monolithic structure. This may be due to the injection moulding process, in which the lock ring 400 may be formed in a single material injection step.

In the present embodiment, the at least one of the plurality of bearing elements 411 may be formed on at least one of the circumferential ends 406-409 of one of the portions 402, 403 of the main body 401 such that it forms a part of the circumferential end 406-409. That is, the at least one of the plurality of bearing elements 411 may be formed such that it is formed at least partially on one of the tool split lines 404, 405.

The at least one of the plurality of bearing elements 411 may be formed by a first part 421 and a second part 422. The first part 421 of the bearing element 411 may be formed on a first circumferential end 406 of the first portion 402 of the main body 401. The second part 422 of the bearing element 411 may be formed on a second circumferential end 409 of the second portion 403 of the main body 401. The second circumferential end 409 of the second portion 403 of the main body 401 may be adjacent to the first circumferential end 406 of the first portion 402 of the main body 401. That is, the first circumferential end 406 of the first portion 402 may be merged with the second circumferential end 409 of the second portion 403 at the tool split line 404. The central mould part may comprise two mould parts, which optionally may each have a hemi-spherical cross-section.

It will be appreciated that the lock ring 400 may comprise a first bearing element 411a that is located at least partially on the first tool split line 404 between the first and second portions 402, 403 of the main body, and a second bearing element, that is not visible in FIG. 4, that is located at least partially on the second tool split line 405 between the first and second portions 402, 403 of the main body 401.

The second bearing element 411b may be identical to the first bearing element 411a as described herein but be located at least partially on the second tool split line 405. Therefore, the second bearing element 411b may comprise a first part 421 formed on a first circumferential end 406 of the second portion 403 of the main body 401, and a second part 422 formed on a second circumferential end 407 of the first portion 402 of the main body 401.

That is, each portion 402, 403 of the main body 401 may comprise the first part 421 of one of the plurality of bearing elements 411 on its first circumferential end 406, 408, and a second part 422 of one of the plurality of bearing elements 411 on its second circumferential end 407, 409. In this configuration, a lock ring 400 that is formed from two integrated portions 402, 403 may comprise a first bearing element 411a that extends across the first tool split line 404 and a second bearing element 411b that extends across the second tool split line 405. Thus, bearing elements 411 may be provided along tool split lines. As a result, the same number of bearing elements may be provided in the embodiments of present application as in known lock rings 300 whilst the complexity of the tooling used to create the lock ring 400 of the present application may be reduced.

Figure 5:
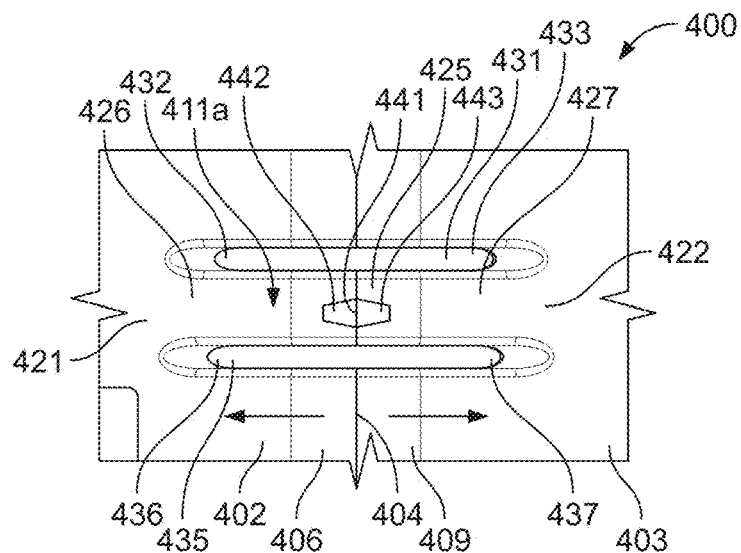
FIG. 5 shows an enlarged schematic front view of a portion of the lock ring of FIG. 4.

Referring now to FIG. 5, a schematic enlarged side view of the lock ring 400 of FIG. 4 is shown with detail of the at least one bearing element 411a shown more clearly. The at least one 411a of the plurality of bearing elements 411 may be formed by a circumferentially extending beam 425.

The circumferentially extending beam 425 may be formed by a first section 426 and a second section 427. The first section 426 of the beam 425 may be formed in the first portion 402 of the main body 401. The second section 427 of the beam 425 may be formed in the second portion 403 of the main body 401. The first and second sections 426, 427 of the beam 425 may merge at the tool split line 404 so as to form a single integral circumferentially extending beam 425.

The circumferentially extending beam 425 may be defined by a first slot 431 and a second slot 435. The first and second slots 431, 435 may extend either side of the circumferentially extending beam 425. The first slot 431 may extend generally circumferentially. The first slot 431 may extend from at least one of the circumferential ends 406, 409 of at least one of the portions 402, 403 of the main body 401.

In the present embodiment, the first slot 431 may extend from the first circumferential end 406 of the first portion 402 of the main body 401 in a direction away from the second portion 403, and from the second circumferential end 409 of the second portion 403 of the main body 401 in a direction away from the first portion 402. Thus, the first slot 431 may extend circumferentially from the first portion 402 of the main body 401 across the first split tool line 404 into the second portion 403 of the main body 401 of the lock ring 400. The first slot 431 may extend through the thickness t, shown in FIG. 6, of the first and second portions 402, 403.

That is, the first slot 431 may comprise a first part 432 that extends in the first portion 402 of the main body 401 and a second part 433 that extends in the second portion 403 of the main body 401. The first and second parts 432, 433 of the first slot 431 may join at the tool split line 404 to form a single integral first slot 431.

The second slot 435 may extend generally circumferentially. The second slot 435 may extend from at least one of the circumferential ends 406, 409 of at least one of the portions 402, 403 of the main body 401.

The second slot 435 may extend from the first circumferential end 406 of the first portion 402 of the main body 401 in a direction away from the second portion 403, and from the second circumferential end 409 of the second portion 403 of the main body 401 in a direction away from the first portion 402. Thus, the second slot 435 may extend circumferentially from the first portion 402 of the main body 401 across the first split tool line 404 into the second portion 403 of the main body 401 of the lock ring 400. The second slot 435 may be a continuous slot. The second slot 435 may extend through the thickness t, shown in FIG. 6, of the first and second portions 402, 403

That is, the second slot 435 may comprise a first part 436 that extends in the first portion 402 of the main body 401 and a second part 437 that extends in the second portion 403 of the main body 401. The first and second parts 436, 437 of the second slot 435 may join at the tool split line 404 to form a single integral second slot 435.

In some embodiments, the first and second slots 431, 435 may extend generally perpendicularly to the longitudinal axis of the main body 401 of the lock ring 400. In some embodiments, the first and second slots 431, 435 may extend generally parallel to each other. The first and second slots 431, 435 may have the same length. The first closed end of the first and second slots 431, 435 in the first portion 402 of the main body 401 may be circumferentially aligned. The second closed end of the first and second slots 431, 435 in the second portion 403 of the main body 401 may be circumferentially aligned.

Figure 6:
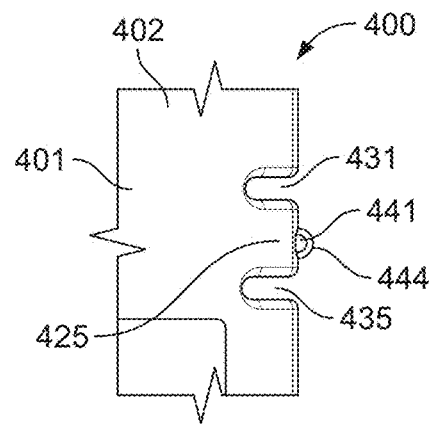
FIG. 6 shows an enlarged schematic side view of the portion of the lock ring of FIG. 5.

As illustrated in FIGS. 5 and 6, the at least one 411a of the plurality of bearing elements 411 may comprise a radially outwardly extending protrusion 441. The protrusion 441 may be located centrally on the circumferentially extending beam 425. That is, the protrusion 441 may extend across the first tool split line 404. Thus, the protrusion 441 may comprise a first part 442 and a second part 443. The first part 442 may be located on the first section 426 of the beam 425 of the first portion 402 of the main body 401. The second part 442 may be located on the second section 427 of the beam 425 of the second portion 403 of the main body 401. The first and second parts 442, 443 of the protrusion 441 may merge at the first tool split line 404.

The protrusion 441 may have a hemi-circular cross-section that extends in the circumferential direction. The rounded outer surface 444 of the protrusion 441 may limit the contact surface area of the bearing element 411 with the inner surface of the body 201 of the medicament delivery device 200, during use. However, it will be appreciated that in alternative embodiments, the protrusion 441 may have a different cross-section area in the circumferential direction. The protrusion 441 may be located equidistantly in the longitudinal direction between the first and second slots 431, 435.

In some embodiments, the protrusion 441 may be tapered, as shown in FIGS. 5 and 6. That is, in some embodiments, the cross-sectional area of the protrusion 441 may reduce in the circumferential direction with distance from the tool split line 404. Thus, the protrusion 441 may extend radially to its greatest extent at the tool split line 404.

As shown in FIG. 5, the first and second parts of the at least one 411a, 411b of the plurality of bearing elements 411 may be formed with reflectional symmetry on adjacent portions 402, 403 of the main body 401 of the lock ring 400 about one of the tool split lines 404, 405.

It will be appreciated that the second bearing element 441b may be formed identically to the first bearing element 441a as previously described. However, it will be clear from the previous description that the second bearing element 441b may be formed on the second tool split line 405. The first parts/sections of the bearing element 411b may be formed on the second portion 403 of the main body 401 on or proximate to the first circumferential end 408 of the second portion 403, and the second parts/sections of the bearing element 441b may be formed on the first portion 402 of the main body 401 on or proximate to the second circumferential end 407 of the first portion 402.

Figure 7:
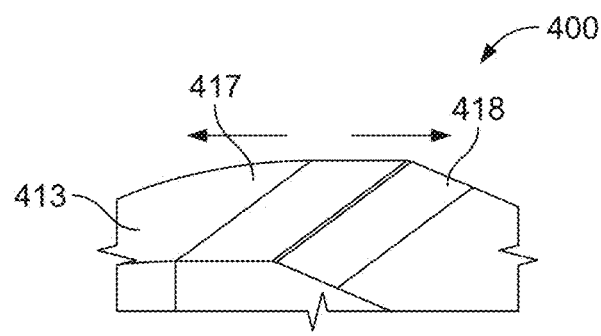
FIG. 7 shows an enlarged perspective view of a portion of a lock ring.

Referring briefly to FIG. 7, a perspective enlarged view of a portion of the first section 413 of the lock ring 400 is shown. The first section 413 of the lock ring 400 may comprise a circumferential surface 417. The circumferential surface 417 may comprise a planar section 418. The planar section 418 may extend longitudinal from one longitudinal end to the other longitudinal end of the first section 413 of the lock ring 400. The planar section 418 of the first section 413 of the lock ring 400 may be configured to indicate the position of the lock ring 400 relative to a body 210 of a medicament delivery device 200 during use.

In some embodiments, the planar section 418 may be offset from a planar section (not shown) on the body 201 of a medicament delivery device 200 when the lock ring 400 is in its pre-use position. The planar section 418 may be in alignment with the planar section (not shown) on the body 201 of a medicament delivery device 200 when the lock ring 400 is in its use position. Thus, the planar section 418 may indicate when the dispensing mechanism 229 can be actuated by depressing the button 228.

In the previous description, the components of the integral lock ring 400 have been described with reference to the tool split lines 404, 405 formed on the lock ring 400 as part of the injection moulding process. However, it will be appreciated that the lock ring 400 may be described without reference to the tool split lines. For example, the lock ring 400 may comprise a hollow main body 401 comprising a plurality of bearing elements 411 configured to contact a body 201 of a medicament delivery device 200. At least one of the plurality of bearing elements 411 may be formed from a circumferential beam 425 defined between first and second slots 431, 435 extending through the main body 401. The first and second ends of the beam 425 may be integrally formed with the main body 401. The circumferential beam may comprise a radially outward extending protrusion 441 thereon. The protrusion 441 may be configured to form a low friction rotation surface and contact an inner surface of a body 201 of a medicament delivery device 200 during use.

Figure 8:
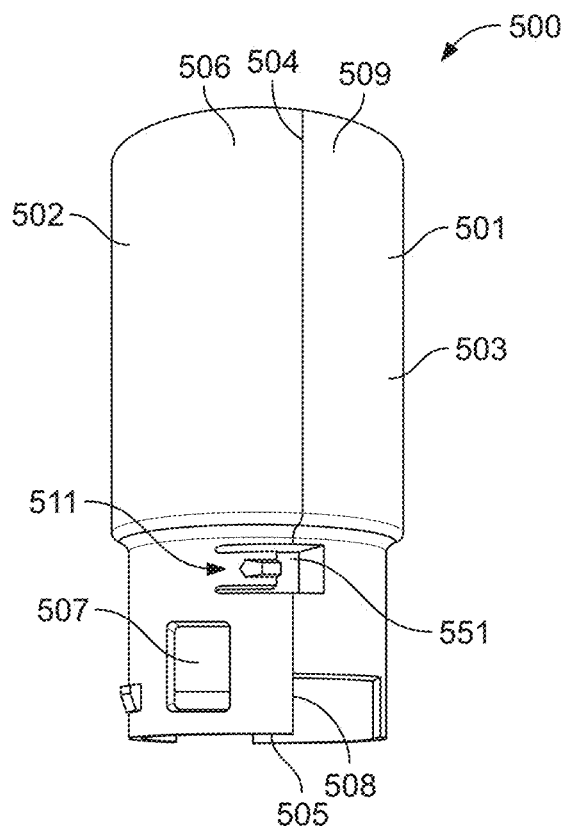
FIG. 8 shows an schematic perspective view of an embodiment of a lock ring.
Figure 9:
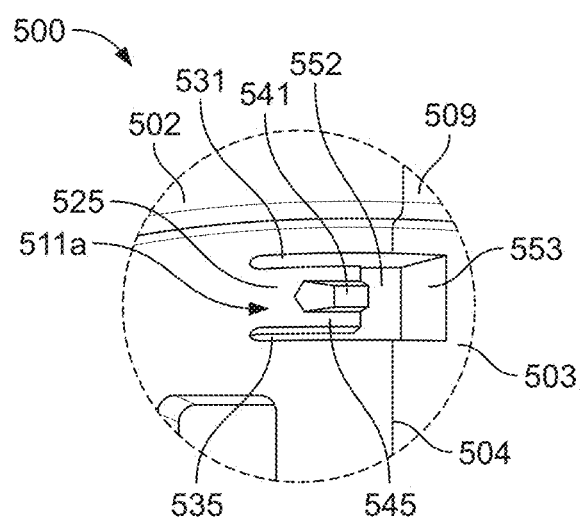
FIG. 9 shows an enlarged schematic front view of a portion of the lock ring of FIG. 8
Figure 10:
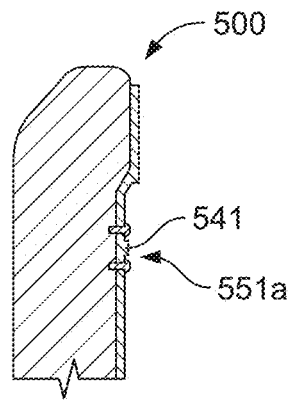
FIG. 10 shows an enlarged schematic side view of the portion of the lock ring of FIG. 9.

Referring now to FIGS. 8 to 10, another embodiment of the lock ring 500 is shown. The lock ring 500 illustrated in FIGS. 8 to 10 is generally the same as the lock ring 400 previously described with reference to FIGS. 4 to 7. Therefore, a detailed description of the lock ring 500 will be omitted herein for brevity. Furthermore, similar features and components of the embodiment of the lock ring 500 shown in FIGS. 8 to 10 will retain the same terminology and similar reference numerals, i.e. increased by 100. The main difference between the lock ring 500 of the present embodiment and the lock ring 400 of FIGS. 4 to 7 is the configuration of the bearing element 511.

In the present embodiment, the main body 501 of the lock ring 500 may be formed by a first portion 502 and a second portion 503, as explained in more detail with regards to the previous embodiment. The first and second portions 502, 503 may be defined between two tool split lines 504, 505 such that the first portion 502 has a first circumferential end 506 and a second circumferential end 507 and the second portion 503 has a first circumferential end 508 and a second circumferential end 509. The first circumferential end 506 of the first portion 502 may merge with the second circumferential end 509 of the second portion 503 at the first tool split line 504. The second circumferential end 507 of the first portion 502 may merge with the first circumferential end 508 of the second portion 503 at the second tool split line 505.

Thus, the first and second portions 502, 503 of the main body 501 of the lock ring 500 may be integrally formed. That is, the first and second portions 502, 503 of the main body 501 may be formed as an integrated monolithic structure.

In the present embodiment, the at least one of the plurality of bearing elements 511 may be formed proximate to, but spaced from, at least one of the circumferential ends 506-509 of at least one of the portions 502, 503 of the main body 501. That is, the at least one of the plurality of bearing elements 511 may be formed proximate to, but spaced from, one of the tool split lines 504, 505.

In the present embodiment, the at least one of the plurality of bearing elements 511 may be spaced circumferentially from one of the circumferential ends 506-509 of one of the portions 502, 503 of the main body 501. Thus, a first bearing element 511a of the plurality of bearing elements 511 may be formed proximate to the first circumferential end 506 of the first portion 502 of the main body 501 and a second bearing element 511b of the plurality of bearing elements 511 may be formed proximate to the first circumferential end 508 of the second portion 502 of the main body 501.

The at least one of the plurality of bearing elements 511 may be spaced circumferentially from one of the circumferential ends 506-509 of one of the portions 502, 503 of the main body 501 by an aperture 551. For example, as shown in FIG. 7, a first bearing element 511a may be located on the first portion 502 of the main body 501. However, the first bearing element 511a may be spaced from the first circumferential end 506, or first tool split line 504, of the main body 501 by a first aperture 551a. Likewise, a second bearing element 511b may be located on the second portion 503 of the main body 501. However, the second bearing element 511b may be spaced from the first circumferential end 508, to second tool split line 505, of the main body 501 by a second aperture 551b.

In some embodiments, the aperture 551 may comprise a first portion 552 and a second portion 553. The first portion 552 of the aperture 551 may be formed in the first portion 502 of the main body 501. The first portion 552 of the aperture 551 may extend from the first tool split line 504 circumferentially away from the second portion 503 of the main body 501. The second portion 553 of the aperture 551 may be formed in the second portion 503 of the main body 501. The second portion 553 of the aperture 551 may extend from the first tool split line 504 circumferentially away from the first portion 502 of the main body 501. The first and second portions 552, 553 of the aperture 551 may merge at the first tool split line 504 so as to form a single integral aperture 551.

It will be appreciated that the lock ring 500 may comprise a first bearing element 551a that is located proximate to but spaced from the first tool split line 504 between the first and second portions 502, 503 of the main body 501, and a second bearing element 511b, that is not visible in FIG. 8, that is located proximate to but spaced from the second tool split line 505 between the first and second portions 502, 503 of the main body 501. The second bearing element 511b may be identical to the first bearing element 511a as described herein.

Referring now to FIG. 9, a schematic enlarged side view of the lock ring 500 of FIG. 8 is shown with detail of the at least one bearing element 511a shown more clearly. The at least one 511a of the plurality of bearing elements 511 may be formed by a circumferentially extending beam 525.

The circumferentially extending beam 525 of the first bearing element 551a may be formed in the first portion 502 of the main body 501. The beam 525 may be defined by a first slot 531, a second slot 535, and the aperture 551. The first and second slots 531, 535 may extend either side of the circumferentially extending beam 525. The first slot 531 may extend generally circumferentially. The first slot 531 may extend from the aperture 551 in a direction away from the second portion 503, i.e. away from the first tool split line 504. The second slot 535 may extend generally circumferentially. The second slot 535 may extend from the aperture 551 in a direction away from the second portion 503, i.e. away from the first tool split line 504.

The aperture 551 may define a free-end 545 of the beam 525. The free-end 545 of the beam 525 may be spaced from the second portion 503 of the main body 501 by the aperture 551.

As illustrated in FIGS. 9 and 10, the at least one 551a of the plurality of bearing elements 511 may comprise a radially outwardly extending protrusion 541. The protrusion 541 may be located proximate to the free-end 545 of the circumferentially extending beam 525. In some embodiments, a circumferential end 546 of the protrusion 541 may be located on the free-end 545 of the circumferentially extending beam 525.

In some embodiments, the first and second bearing elements 511a, 511b may be formed with rotational symmetry on adjacent portions of the main body 501 about a central longitudinal axis of the main body 501 of the lock ring 500.

It will be appreciated that the second bearing element 541b according to the present invention may be formed identically to the first bearing element 541a as previously described. However, it will be clear from the previous description that the second bearing element 541b may be formed proximate to the second tool split line 505. The second bearing element 511b may be formed on the second portion 503 of the main body 501 on or proximate to the first circumferential end 508 of the second portion 503.

In the previous description, the components of the integral lock ring 500 have been described with reference to the tool split lines 504, 505 formed on the lock ring 500 as part of the injection moulding process. However, it will be appreciated that the lock ring 500 may be described without reference to the tool split lines. For example, the lock ring 500 may comprise a hollow main body 501 comprising a plurality of bearing elements 511 configured to contact a body 201 of a medicament delivery device 200. At least one 511a of the plurality of bearing elements 511 maybe formed from a circumferential extending beam 525 defined between first and second slots 531, 535 extending through the main body 501. The circumferential beam 525 may comprise a free-end 545 that is spaced from the rest of the main body 501 by an aperture 551. The circumferential beam 525 may comprise a radially outward extending protrusion 541 thereon. The protrusion 541 may be configured to form a low friction rotation surface and contact an inner surface of a body 201 of a medicament delivery device 200 during use.

In a second aspect, there is provided a medicament delivery device comprising a lock ring 400, 500 as previously described.

In a third aspect, there is provided a method of forming a lock ring 400, 500 as previously described. The method of forming the lock ring 400, 500 comprises the steps of positioning a plurality of mould parts to form a lock ring shaped cavity, providing a material injection port in at least one of the mould parts, performing a single injection of material into the lock ring shaped cavity to fill the lock ring shaped cavity, and cooling the material to form the lock ring 400, 500.

The terms "drug" or "medicament" are used synonymously herein and describe a pharmaceutical formulation containing one or more active pharmaceutical ingredients or pharmaceutically acceptable salts or solvates thereof, and optionally a pharmaceutically acceptable carrier. An active pharmaceutical ingredient ("API"), in the broadest terms, is a chemical structure that has a biological effect on humans or animals. In pharmacology, a drug or medicament is used in the treatment, cure, prevention, or diagnosis of disease or used to otherwise enhance physical or mental well-being. A drug or medicament may be used for a limited duration, or on a regular basis for chronic disorders.

As described below, a drug or medicament can include at least one API, or combinations thereof, in various types of formulations, for the treatment of one or more diseases. Examples of API may include small molecules having a molecular weight of 500 Da or less; polypeptides, peptides and proteins (e.g., hormones, growth factors, antibodies, antibody fragments, and enzymes); carbohydrates and polysaccharides; and nucleic acids, double or single stranded DNA (including naked and cDNA), RNA, antisense nucleic acids such as antisense DNA and RNA, small interfering RNA (siRNA), ribozymes, genes, and oligonucleotides. Nucleic acids may be incorporated into molecular delivery systems such as vectors, plasmids, or liposomes. Mixtures of one or more drugs are also contemplated.

The drug or medicament may be contained in a primary package or "drug container" adapted for use with a drug delivery device. The drug container may be, e.g., a cartridge, syringe, reservoir, or other solid or flexible vessel configured to provide a suitable chamber for storage (e.g., short- or long-term storage) of one or more drugs. For example, in some instances, the chamber may be designed to store a drug for at least one day (e.g., 1 to at least 30 days). In some instances, the chamber may be designed to store a drug for about 1 month to about 2 years. Storage may occur at room temperature (e.g., about 20° C.), or refrigerated temperatures (e.g., from about −4° C. to about 4° C.). In some instances, the drug container may be or may include a dual-chamber cartridge configured to store two or more components of the pharmaceutical formulation to-be-administered (e.g., an API and a diluent, or two different drugs) separately, one in each chamber. In such instances, the two chambers of the dual-chamber cartridge may be configured to allow mixing between the two or more components prior to and/or during dispensing into the human or animal body. For example, the two chambers may be configured such that they are in fluid communication with each other (e.g., by way of a conduit between the two chambers) and allow mixing of the two components when desired by a user prior to dispensing. Alternatively or in addition, the two chambers may be configured to allow mixing as the components are being dispensed into the human or animal body.

The drugs or medicaments contained in the drug delivery devices as described herein can be used for the treatment and/or prophylaxis of many different types of medical disorders. Examples of disorders include, e.g., diabetes mellitus or complications associated with diabetes mellitus such as diabetic retinopathy, thromboembolism disorders such as deep vein or pulmonary thromboembolism. Further examples of disorders are acute coronary syndrome (ACS), angina, myocardial infarction, cancer, macular degeneration, inflammation, hay fever, atherosclerosis and/or rheumatoid arthritis. Examples of APIs and drugs are those as described in handbooks such as Rote Liste 2014, for example, without limitation, main groups 12 (anti-diabetic drugs) or 86 (oncology drugs), and Merck Index, 15th edition.

Examples of APIs for the treatment and/or prophylaxis of type 1 or type 2 diabetes mellitus or complications associated with type 1 or type 2 diabetes mellitus include an insulin, e.g., human insulin, or a human insulin analogue or derivative, a glucagon-like peptide (GLP-1), GLP-1 analogues or GLP-1 receptor agonists, or an analogue or derivative thereof, a dipeptidyl peptidase-4 (DPP4) inhibitor, or a pharmaceutically acceptable salt or solvate thereof, or any mixture thereof. As used herein, the terms "analogue" and "derivative" refers to a polypeptide which has a molecular structure which formally can be derived from the structure of a naturally occurring peptide, for example that of human insulin, by deleting and/or exchanging at least one amino acid residue occurring in the naturally occurring peptide and/or by adding at least one amino acid residue. The added and/or exchanged amino acid residue can either be codable amino acid residues or other naturally occurring residues or purely synthetic amino acid residues. Insulin analogues are also referred to as "insulin receptor ligands". In particular, the term "derivative" refers to a polypeptide which has a molecular structure which formally can be derived from the structure of a naturally occurring peptide, for example that of human insulin, in which one or more organic substituent (e.g. a fatty acid) is bound to one or more of the amino acids. Optionally, one or more amino acids occurring in the naturally occurring peptide may have been deleted and/or replaced by other amino acids, including non-codeable amino acids, or amino acids, including non-codeable, have been added to the naturally occurring peptide.

Examples of insulin analogues are Gly(A21), Arg(B31), Arg(B32) human insulin (insulin glargine); Lys(B3), Glu (B29) human insulin (insulin glulisine); Lys(B28), Pro(B29) human insulin (insulin lispro); Asp(B28) human insulin (insulin aspart); human insulin, wherein proline in position B28 is replaced by Asp, Lys, Leu, Val or Ala and wherein in position B29 Lys may be replaced by Pro; Ala(B26) human insulin; Des(B28-B30) human insulin; Des(B27) human insulin and Des(B30) human insulin.

Examples of insulin derivatives are, for example, B29-N-myristoyl-des(B30) human insulin, Lys(B29) (N-tetradecanoyl)-des(B30) human insulin (insulin detemir, Levemir®); B29-N-palmitoyl-des(B30) human insulin; B29-N-myristoyl human insulin; B29-N-palmitoyl human insulin; B28-N-myristoyl LysB28ProB29 human insulin; B28-N-palmitoyl-LysB28ProB29 human insulin; B30-N-myristoyl-ThrB29LysB30 human insulin; B30-N-palmitoyl-ThrB29LysB30 human insulin; B29-N—(N-palmitoyl-gamma-glutamyl)-des(B30) human insulin, B29-N-omega-carboxypentadecanoyl-gamma-L-glutamyl-des(B30) human insulin (insulin degludec, Tresiba®); B29-N—(N-lithocholyl-gamma-glutamyl)-des(B30) human insulin; B29-N-(ω-carboxyheptadecanoyl)-des(B30) human insulin and B29-N-(ω-carboxyheptadecanoyl) human insulin.

Examples of GLP-1, GLP-1 analogues and GLP-1 receptor agonists are, for example, Lixisenatide (Lyxumia®), Exenatide (Exendin-4, Byetta®, Bydureon®, a 39 amino acid peptide which is produced by the salivary glands of the Gila monster), Liraglutide (Victoza®), Semaglutide, Taspoglutide, Albiglutide (Syncria®), Dulaglutide (Trulicity®), rExendin-4, CJC-1134-PC, PB-1023, TTP-054, Langlenatide/HM-11260C (Efpeglenatide), HM-15211, CM-3, GLP-1 Eligen, ORMD-0901, NN-9423, NN-9709, NN-9924, NN-9926, NN-9927, Nodexen, Viador-GLP-1, CVX-096, ZYOG-1, ZYD-1, GSK-2374697, DA-3091, MAR-701, MAR709, ZP-2929, ZP-3022, ZP-DI-70, TT-401 (Pegapamodtide), BHM-034. MOD-6030, CAM-2036, DA-15864, ARI-2651, ARI-2255, Tirzepatide (LY3298176), Bamadutide (SAR425899), Exenatide-XTEN and Glucagon-Xten.

An example of an oligonucleotide is, for example: mipomersen sodium (Kynamro®), a cholesterol-reducing antisense therapeutic for the treatment of familial hypercholesterolemia or RG012 for the treatment of Alport syndrome.

Examples of DPP4 inhibitors are Linagliptin, Vildagliptin, Sitagliptin, Denagliptin, Saxagliptin, Berberine.

Examples of hormones include hypophysis hormones or hypothalamus hormones or regulatory active peptides and their antagonists, such as Gonadotropine (Follitropin, Lutropin, Choriongonadotropin, Menotropin), Somatropine (Somatropin), Desmopressin, Terlipressin, Gonadorelin, Triptorelin, Leuprorelin, Buserelin, Nafarelin, and Goserelin. Examples of polysaccharides include a glucosaminoglycane, a hyaluronic acid, a heparin, a low molecular weight heparin or an ultra-low molecular weight heparin or a derivative thereof, or a sulphated polysaccharide, e.g. a poly-sulphated form of the above-mentioned polysaccharides, and/or a pharmaceutically acceptable salt thereof. An example of a pharmaceutically acceptable salt of a polysulphated low molecular weight heparin is enoxaparin sodium. An example of a hyaluronic acid derivative is Hylan G-F 20 (Synvisc®), a sodium hyaluronate.

The term "antibody", as used herein, refers to an immunoglobulin molecule or an antigen-binding portion thereof. Examples of antigen-binding portions of immunoglobulin molecules include F(ab) and F(ab')2 fragments, which retain the ability to bind antigen. The antibody can be polyclonal, monoclonal, recombinant, chimeric, de-immunized or humanized, fully human, non-human, (e.g., murine), or single chain antibody. In some embodiments, the antibody has effector function and can fix complement. In some embodiments, the antibody has reduced or no ability to bind an Fc receptor. For example, the antibody can be an isotype or subtype, an antibody fragment or mutant, which does not support binding to an Fc receptor, e.g., it has a mutagenized or deleted Fc receptor binding region. The term antibody also includes an antigen-binding molecule based on tetravalent bispecific tandem immunoglobulins (TBTI) and/or a dual variable region antibody-like binding protein having cross-over binding region orientation (CODV).

The terms "fragment" or "antibody fragment" refer to a polypeptide derived from an antibody polypeptide molecule (e.g., an antibody heavy and/or light chain polypeptide) that does not comprise a full-length antibody polypeptide, but that still comprises at least a portion of a full-length antibody polypeptide that is capable of binding to an antigen. Antibody fragments can comprise a cleaved portion of a full length antibody polypeptide, although the term is not limited to such cleaved fragments. Antibody fragments that are useful in the present invention include, for example, Fab fragments, F(ab')2 fragments, scFv (single-chain Fv) fragments, linear antibodies, monospecific or multispecific antibody fragments such as bispecific, trispecific, tetraspecific and multispecific antibodies (e.g., diabodies, triabodies, tetrabodies), monovalent or multivalent antibody fragments such as bivalent, trivalent, tetravalent and multivalent antibodies, minibodies, chelating recombinant antibodies, tribodies or bibodies, intrabodies, small modular immunopharmaceuticals (SMIP), binding-domain immunoglobulin fusion proteins, camelized antibodies, and immunoglobulin single variable domains. Additional examples of antigen-binding antibody fragments are known in the art.

The term "immunoglobulin single variable domain" (ISV), interchangeably used with "single variable domain", defines immunoglobulin molecules wherein the antigen binding site is present on, and formed by, a single immunoglobulin domain. As such, immunoglobulin single variable domains are capable of specifically binding to an epitope of the antigen without pairing with an additional immunoglobulin variable domain. The binding site of an immunoglobulin single variable domain is formed by a single heavy chain variable domain (VH domain or VHH domain) or a single light chain variable domain (VL domain). Hence, the antigen binding site of an immunoglobulin single variable domain is formed by no more than three CDRs.

An immunoglobulin single variable domain (ISV) can be a heavy chain ISV, such as a VH (derived from a conventional four-chain antibody), or VHH (derived from a heavy-chain antibody), including a camelized VH or humanized VHH. For example, the immunoglobulin single variable domain may be a (single) domain antibody, a "dAb" or dAb or a Nanobody® ISV (such as a VHH, including a humanized VHH or camelized VH) or a suitable fragment thereof.

[Note: Nanobody® is a registered trademark of Ablynx N.V.]; other single variable domains, or any suitable fragment of any one thereof.

"VHH domains", also known as VHHs, VHH antibody fragments, and VHH antibodies, have originally been described as the antigen binding immunoglobulin variable domain of "heavy chain antibodies" (i.e., of "antibodies devoid of light chains"; Hamers-Casterman et al. 1993 (Nature 363: 446-448). The term "VHH domain" has been chosen in order to distinguish these variable domains from the heavy chain variable domains that are present in conventional 4-chain antibodies (which are referred to herein as "VH domains") and from the light chain variable domains that are present in conventional 4-chain antibodies (which are referred to herein as "VL domains"). For a further description of VHH's, reference is made to the review article by Muyldermans 2001 (Reviews in Molecular Biotechnology 74: 277-302).

For the term "dAb's" and "domain antibody", reference is for example made to Ward et al. 1989 (Nature 341: 544), to Holt et al. 2003 (Trends Biotechnol. 21: 484); as well as to WO 2004/068820, WO 2006/030220, WO 2006/003388. It should also be noted that, although less preferred in the context of the present invention because they are not of mammalian origin, single variable domains can be derived from certain species of shark (for example, the so-called "IgNAR domains", see for example WO 2005/18629).

The terms "Complementarity-determining region" or "CDR" refer to short polypeptide sequences within the variable region of both heavy and light chain polypeptides that are primarily responsible for mediating specific antigen recognition. The term "framework region" refers to amino acid sequences within the variable region of both heavy and light chain polypeptides that are not CDR sequences, and are primarily responsible for maintaining correct positioning of the CDR sequences to permit antigen binding. Although the framework regions themselves typically do not directly participate in antigen binding, as is known in the art, certain residues within the framework regions of certain antibodies can directly participate in antigen binding or can affect the ability of one or more amino acids in CDRs to interact with antigen.

Examples of antibodies are anti PCSK-9 mAb (e.g., Alirocumab), anti IL-6 mAb (e.g., Sarilumab), and anti IL-4 mAb (e.g., Dupilumab).

Pharmaceutically acceptable salts of any API described herein are also contemplated for use in a drug or medicament in a drug delivery device. Pharmaceutically acceptable salts are for example acid addition salts and basic salts.

Those of skill in the art will understand that modifications (additions and/or removals) of various components of the APIs, formulations, apparatuses, methods, systems and embodiments described herein may be made without departing from the full scope and spirit of the present invention, which encompass such modifications and any and all equivalents thereof.

An example drug delivery device may involve a needle-based injection system as described in Table 1 of section 5.2 of ISO 11608-1:2014(E). As described in ISO 11608-1:2014 (E), needle-based injection systems may be broadly distinguished into multi-dose container systems and single-dose (with partial or full evacuation) container systems. The container may be a replaceable container or an integrated non-replaceable container.

As further described in ISO 11608-1:2014(E), a multi-dose container system may involve a needle-based injection device with a replaceable container. In such a system, each container holds multiple doses, the size of which may be fixed or variable (pre-set by the user). Another multi-dose container system may involve a needle-based injection device with an integrated non-replaceable container. In such a system, each container holds multiple doses, the size of which may be fixed or variable (pre-set by the user).

As further described in ISO 11608-1:2014(E), a single-dose container system may involve a needle-based injection device with a replaceable container. In one example for such a system, each container holds a single dose, whereby the entire deliverable volume is expelled (full evacuation). In a further example, each container holds a single dose, whereby a portion of the deliverable volume is expelled (partial evacuation). As also described in ISO 11608-1:2014 (E), a single-dose container system may involve a needle-based injection device with an integrated non-replaceable container. In one example for such a system, each container holds a single dose, whereby the entire deliverable volume is expelled (full evacuation). In a further example, each container holds a single dose, whereby a portion of the deliverable volume is expelled (partial evacuation).

An example of a compound to be administered with the drug delivery device disclosed herein is a compound with the INN tirzepatide, as referenced in claim 1 of U.S. Pat. No. 9,474,780.

An example of a pharmaceutical composition to be administered with the drug delivery device disclosed herein is a pharmaceutical composition as referenced in U.S. Pat. No. 11,357,820.

An example of a pharmaceutical composition to be administered with the drug delivery device disclosed herein includes a 0.5 mL solution of 2.5 mg, 5 mg, 7.5 mg, 10 mg, 12.5 mg, or 15 mg of tirzepatide and the following excipients sodium chloride (4.1 mg), sodium phosphate dibasic heptahydrate (0.7 mg), and water for injection. Hydrochloric acid solution and/or sodium hydroxide solution may be added to adjust the pH.

An example starting dosage tirzepatide may be 2.5 mg injected subcutaneously once weekly. After four weeks, the tirzepatide dosage may be increased to 5 mg injected subcutaneously once weekly. The dosage may be further increased in 2.5 mg increments after at least four weeks on the current dose. In an example, the maximum dosage of tirzepatide may be 15 mg injected subcutaneously once weekly. If a dose is missed, patients may be instructed to administer tirzepatide as soon as possible within four days (96 hours) after the missed dose. If more than four days have passed, patients may skip the missed dose and administer the next dose on the regularly scheduled day. In each case, patients may then resume their regular once weekly dosing schedule. The day of weekly administration may be changed, if necessary. The time between two doses may be at least three days (72 hours).

Tirzepatide dosages may include 2.5 mg/0.5 mL, 5 mg/0.5 mL, 7.5 mg/0.5 mL, 10 mg/0.5 mL, 12.5 mg/0.5 mL, and 15 mg/0.5 mL. Tirzepatide may be stored in a refrigerator at 2° C. to 8° C. (36° F. to 46° F.). A single-dose pen or single-dose vial may be stored unrefrigerated at temperatures not to exceed 30° C. (86° F.) for up to 21 days. Tirzepatide may be stored in a carton.

LIST OF REFERENCE NUMERALS

10—Device
11—Housing
12—Cap
13—Needle Sleeve
17—Needle
20—Distal Region
21—Proximal Region
22—Button
23—Piston
200—Medicament Delivery Device
201—Body
202—Distal End
208—Locking Member
216—Lock Ring
217—Needle
223—Plunger
227—Actuation Member
228—Button
229—Dispensing Mechanism
232—Injection Site
240—Spring Guide
242—Protrusions
250—Syringe
251—Flange
252—Body
254—Cap
258—Stop
260—Spring
262—Spring
264—Clip
265—Proximal Opening
266—Needle Shield
267—Collar
268—Collar
300 Lock Ring
301 Main Body
302 First Section
303 Second Section
304 Portions
305 Bearing Element
306 Slot
307 Apex
308 Protrusion
400—Lock Ring
401 Main Body
402 First Portion of Main Body
403 Second Portion of Main Body
404 First Tool Split Line
405 Second Tool Split Line
406 First Circumferential End of First Portion
407 Second Circumferential End of First Portion
408 First Circumferential End of Second Portion
409 Second Circumferential End of Second Portion
411 Bearing Element
413 First Section
414 Second Section
415 Shoulder
417 Circumferential Surface
418 Planar Section
421 First Part of Bearing Element
422 Second Part of Bearing Element
425 Circumferentially Extending Beam
426 First Section of Beam
427 Second Section of Beam
431 First Slot
432 First Part of First Slot
433 Second Part of First Slot
435 Second Slot
436 First Part of Second Slot
437 Second Part of Second Slot
441 Protrusion 442 First Part of Protrusion
443 Second Part of Protrusion
444 Outer Surface of Protrusion
500 Lock Ring
501 Main Body
502 First Portion of Main Body
503 Second Portion of Main Body
504 First Tool Split Line
505 Second Tool Split Line
506 First Circumferential End of First Portion
507 Second Circumferential End of First Portion
508 First Circumferential End of Second Portion
509 Second Circumferential End of Second Portion
511 Bearing Element
525 Circumferentially Extending Beam
531 First Slot
535 Second Slot
541 Protrusion
545 Free-End of Beam
546 Circumferential End
551 Aperture
552 First Portion of Aperture
553 Second Portion of Aperture

The invention claimed is:

1. A lock ring for a medicament delivery device, the lock ring comprising:
  a hollow main body formed from a plurality of circumferentially extending portions, wherein each portion is defined between tool split lines defining circumferential ends of the portions, and each circumferential end of a portion is connected to an adjacent portion along a tool split line,
  wherein the main body comprises a plurality of bearing elements configured to contact a body of the medicament delivery device,
    wherein each of the plurality of bearing elements is configured to form a low friction rotation interface, and
    wherein at least one of the plurality of bearing elements is formed on or proximate to one of the circumferential ends of a portion of the main body.

2. The lock ring according to claim 1, wherein the at least one of the plurality of bearing elements is formed on at least one of the circumferential ends of one of the portions of the main body such that it forms a part of the circumferential ends.

3. The lock ring according to claim 2, wherein the at least one of the plurality of bearing elements is formed by a first part and a second part, the first part being formed on a first circumferential end of a first portion of the main body, and the second part being formed on a second circumferential end of a second portion of the main body that is adjacent to the first portion of the main body.

4. The lock ring according to claim 3, wherein the first and second parts of the at least one of the plurality of bearing elements are formed with reflectional symmetry on adjacent portions of the main body about the tool split line.

5. The lock ring according to claim 3, wherein each portion of the main body comprises a first part of one of the plurality of bearing elements on its first circumferential end and a second part of one of the plurality of bearing elements on its second circumferential end.

6. The lock ring according to claim 1, wherein the at least one of the plurality of bearing elements is spaced circumferentially from one of the circumferential ends of one of the portions of the main body by an aperture.

7. The lock ring according to claim 6, wherein a first bearing of the plurality of bearing elements is formed proximate to a first circumferential end of a first portion of the main body and a second bearing element is formed proximate to a first circumferential end of a second portion of the main body.

8. The lock ring according to claim 7, wherein the first and second bearing elements are formed with rotational symmetry on adjacent portions of the main body about a central longitudinal axis of the main body.

9. The lock ring according to claim 8, wherein the at least one of the plurality of bearing elements is formed by a circumferentially extending beam.

10. The lock ring according to claim 9, wherein the circumferentially extending beam is defined by first and second slots extending either side of the beam.

11. The lock ring according to claim 10, wherein the first and second slots extend generally circumferentially from at least one of the circumferential ends of at least one portion of the main body.

12. The lock ring according to claim 10, wherein the first and second slots extend perpendicularly to the longitudinal axis of the main body and parallel to each other.

13. The lock ring according to claim 9, wherein the circumferentially extending beam comprises a radially outwardly extending protrusion.

14. The lock ring according to claim 13, wherein a circumferential end of the protrusion is located on a free-end of the circumferentially extending beam.

15. The lock ring according to claim 9, wherein a first section of the circumferential beam is formed in the first portion of the main body, and a second section of the circumferential beam is formed in the second portion of the main body, the first section and the second section of the circumferential beam being merged at the tool split line.

16. The lock ring according to claim 1, wherein the main body is formed from two circumferentially extending portions.

17. The lock ring according to claim 1, wherein each of the circumferentially extending portions comprises:
  a first section configured to form an outer surface of a medicament delivery device, and
  a second section comprising the plurality of bearing elements, the second section being configured to be received within a housing of a medicament delivery device,
  wherein the first section comprises a circumferential surface, and
  wherein the circumferential surface of the first section of at least one of the portions comprises a planar section configured to indicate a position of the lock ring relative to a medicament delivery device during use.

18. The lock ring according claim 1, wherein components of the lock ring are an integrally formed monolithic structure.

19. A medicament delivery device comprising:
  a lock ring comprising:
  a hollow main body formed from a plurality of circumferentially extending portions, wherein each portion is defined between tool split lines defining circumferential ends of the portions, and each circumferential end of a portion is connected to an adjacent portion along a tool split line,
  wherein the main body comprises a plurality of bearing elements configured to contact a body of the medicament delivery device, wherein each of the plurality of bearing elements is configured to form a low friction rotation interface, and wherein at least one of the plurality of bearing elements is formed on or proximate to one of the circumferential ends of a portion of the main body.

20. A method of forming a lock ring, the method comprising:

positioning a plurality of mould parts to form a lock ring shaped cavity;

providing a material injection port in at least one of the mould parts;

performing a single injection of material into the lock ring shaped cavity to fill the lock ring shaped cavity; and cooling the material to form the lock ring.

21. A lock ring for a medicament delivery device, the lock ring comprising:

a hollow main body comprising a plurality of bearing elements configured to contact a body of a medicament delivery device, wherein at least one of the plurality of bearing elements is formed from a circumferential beam defined between first and second slots extending through the main body, wherein (i) first and second ends of the beam are connected to the main body or (ii) the circumferential beam comprises a free end that is spaced from the main body by an aperture, and wherein the circumferential beam comprises a radially outward extending protrusion thereon, the protrusion being configured to form a low friction rotation surface and contact an inner surface of a body of a medicament delivery device during use.

* * * * *